United States Patent
Han et al.

(10) Patent No.: US 7,899,406 B2
(45) Date of Patent: Mar. 1, 2011

(54) APPARATUS FOR SUPPRESSING CROSS MODULATION NOISE IN DIVERSITY SYSTEM OF MOBILE TERMINAL RECEIVER

(75) Inventors: Sang-Kook Han, Suwon-si (KR); Seong-Joong Kim, Yongin-si (KR); Young-Il Son, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1435 days.

(21) Appl. No.: 11/263,037

(22) Filed: Oct. 31, 2005

(65) Prior Publication Data

US 2006/0121857 A1 Jun. 8, 2006

(30) Foreign Application Priority Data

Dec. 7, 2004 (KR) .................... 10-2004-0102389

(51) Int. Cl.
*H04B 1/38* (2006.01)
(52) U.S. Cl. .............. 455/73; 455/272; 455/277.1; 455/277.2; 455/278.1; 455/307
(58) Field of Classification Search .......... 455/73, 455/570, 272, 277.1, 277.2, 278.1, 296, 307
See application file for complete search history.

(56) References Cited

U.S. PATENT DOCUMENTS

| | | | | |
|---|---|---|---|---|
| 2,229,044 A | * | 1/1941 | Butler | 455/132 |
| 3,626,294 A | * | 12/1971 | Dancy | 455/222 |
| 4,017,797 A | * | 4/1977 | Laessig | 381/151 |
| 5,047,860 A | * | 9/1991 | Rogalski | 348/738 |
| 5,619,531 A | * | 4/1997 | Taylor et al. | 375/222 |
| 5,764,693 A | * | 6/1998 | Taylor et al. | 375/222 |
| 6,009,129 A | * | 12/1999 | Kenney et al. | 375/346 |
| 6,618,453 B1 | * | 9/2003 | Lundby | 375/346 |

(Continued)

OTHER PUBLICATIONS

Ibata, K., Misu K., Murai K., "An m-Derived Ladder High Pass SAW Filter," Proc. IEEE Ultrasonic Symposium, pp. 397-400, 2003.*

*Primary Examiner*—Matthew D Anderson
*Assistant Examiner*—Erica Fleming-Hall
(74) *Attorney, Agent, or Firm*—The Farrell Law Firm, P.C.

(57) ABSTRACT

Disclosed is an apparatus in a diversity system of a mobile terminal having a main receiving unit and a sub-receiving unit, which includes a sub-antenna for receiving an input signal and a part of a transmitted signal of a transmitting unit, a band-pass filter (BPF) designed to greatly attenuate a low-band frequency of the part of the transmitted signal received through the sub-antenna, a high-pass filter (HPF) for additionally attenuating the part of the transmitted signal attenuated through the BPF, a low-noise amplifier for minimizing a noise of an output value of the HPF, an HPF for passing therethrough only a high-frequency component of an output value of the low-noise amplifier, and a mixer for mixing output values of the HPF and outputting a baseband signal. One of two BPFs in the sub-receiving unit is replaced by one HPF, and thus the HPF can be fabricated on chip with the terminal receiving unit. Additionally, through the on-chip HPF, the use of an additional BPF is eliminated, and the size and the unit price of production of the mobile terminal can also be reduced.

3 Claims, 5 Drawing Sheets

U.S. PATENT DOCUMENTS

| | | | |
|---|---|---|---|
| 6,711,395 B1* | 3/2004 | Tonegawa et al. | 455/313 |
| 6,909,882 B2* | 6/2005 | Hayashi et al. | 455/84 |
| 6,987,953 B2* | 1/2006 | Morris et al. | 455/102 |
| 7,079,195 B1* | 7/2006 | Birleson et al. | 348/725 |
| 7,142,834 B2* | 11/2006 | Miyagi | 455/296 |
| 7,184,722 B1* | 2/2007 | Johnson et al. | 455/127.1 |
| 7,194,242 B2* | 3/2007 | Tanaka et al. | 455/127.3 |
| 7,203,468 B2* | 4/2007 | Narita et al. | 455/114.2 |
| 2002/0094788 A1* | 7/2002 | Hayashi et al. | 455/73 |
| 2002/0132597 A1* | 9/2002 | Peterzell et al. | 455/130 |
| 2002/0140869 A1* | 10/2002 | Carr et al. | 348/726 |
| 2004/0018814 A1* | 1/2004 | Lin et al. | 455/73 |
| 2004/0127182 A1* | 7/2004 | Hayashi | 455/193.1 |
| 2004/0137862 A1* | 7/2004 | Tanaka et al. | 455/127.3 |
| 2004/0179700 A1* | 9/2004 | Neumann et al. | 381/98 |
| 2004/0264601 A1* | 12/2004 | Demir et al. | 375/322 |
| 2005/0104685 A1* | 5/2005 | Kuroki et al. | 333/133 |
| 2005/0181752 A1* | 8/2005 | Sahota | 455/132 |
| 2006/0009177 A1* | 1/2006 | Persico et al. | 455/143 |
| 2006/0040627 A1* | 2/2006 | Koike et al. | 455/210 |
| 2006/0111074 A1* | 5/2006 | Petilli et al. | 455/334 |
| 2006/0111132 A1* | 5/2006 | Choi et al. | 455/501 |
| 2007/0105504 A1* | 5/2007 | Vorenkamp et al. | 455/73 |
| 2007/0218850 A1* | 9/2007 | Pan | 455/189.1 |
| 2008/0020721 A9* | 1/2008 | Morris et al. | 455/103 |

* cited by examiner

APPARATUS FOR SUPPRESSING CROSS MODULATION NOISE IN DIVERSITY SYSTEM OF MOBILE TERMINAL RECEIVER

PRIORITY

This application claims priority to an application entitled "Apparatus for Suppressing Cross Modulation Noise in Diversity System of Mobile Terminal Receiver" filed in the Korean Industrial Property Office on Dec. 7, 2004 and assigned Serial No. 2004-102389, the contents of which are incorporated herein by reference.

BACKGROUND OF THE INVENTION

1. Field of the Invention

The present invention relates to a receiving unit of a mobile terminal, and more particularly to an apparatus for suppressing noise using a band-pass filter and a high-pass filter.

2. Description of the Related Art

Recently, a technique for adding a sub-receiving unit to a mobile terminal receiving unit in addition to a main receiving unit is being applied to the mobile terminal receiving unit in order to heighten the performance of the mobile terminal receiving unit.

FIG. 1 is a view illustrating the construction of a diversity system of a mobile terminal having a sub-receiving unit added thereto. Referring to FIG. 1, the diversity system of the mobile terminal includes a transmitting unit 100 and a receiving unit 130 having a main receiving unit 110 and a sub-receiving unit 120.

The transmitting unit 100 includes a mixer 102, an HPF (High-Pass Filter) 104, an LNA (Low-Noise Amplifier) 106 and a high-frequency amplifier 108. The transmitting unit 100 converts a baseband (hereinafter referred to as a "BB") signal input from a modem of the mobile terminal into a high-frequency signal and outputs the high-frequency signal as a transmitted signal. At this time, a part of the transmitted signal enters into a main antenna 112 and a sub-antenna 122 of the receiving unit 130.

The main receiving unit 110 includes the main antenna 112, a duplexer 114, an LNA 116, an external BPF (Band-Pass Filter) 118 and a mixer 119. The sub-receiving unit 120 includes the sub-antenna 122, two BPFs 124a and 124b, an LNA 126, an HPF 128, and a mixer 129. The received signals input through the main antenna 112 and the sub-antenna 122 are converted into BB signals, and the converted BB signals are input to the modem of the mobile terminal.

As described above, both the main receiving unit 110 and the sub-receiving unit 120 are provided in one chip of the receiving unit 130, and a part of the transmitted signal is input to both the main antenna 112 and the sub-antenna 122. Accordingly, a coupling occurs between a part of the transmitted signal and the received signal in the transmitting unit 100 and the receiving unit 130, and this causes a cross modulation to occur.

Additionally, in the case of the sub-receiving unit 120, two RF (Radio Frequency) SAW (Surface Acoustic Wave) filters are utilized as band-pass filters 124a and 124b, and thus the system cost is increased as the size of the whole system is increased.

SUMMARY OF THE INVENTION

Accordingly, the present invention has been designed to solve the above and other problems occurring in the prior art, and an object of the present invention is to provide an apparatus that can reduce the unit cost of production by replacing one of two BPFs of a sub-receiving unit by an HPF.

Another object of the present invention is to provide an apparatus that can reduce the size of the mobile terminal receiving unit and the unit cost of production by integrating an HPF that can easily be implemented into a chip of the mobile terminal receiving unit.

In order to accomplish the above and other objects, there is provided an apparatus in a diversity system of a mobile terminal having a main receiving unit and a sub-receiving unit, which includes a sub-antenna for receiving an input signal and a part of a transmitted signal of a transmitting unit, a band-pass filter designed to greatly attenuate a low-band frequency of the part of the transmitted signal received through the sub-antenna, a high-pass filter for additionally attenuating the part of the transmitted signal attenuated through the band-pass filter, a low-noise amplifier for minimizing the noise of an output value of the high-pass filter, a high-pass filter for passing therethrough only a high-frequency component of an output value of the low-noise amplifier, and a mixer for mixing output values of the high-pass filter and outputting a baseband signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
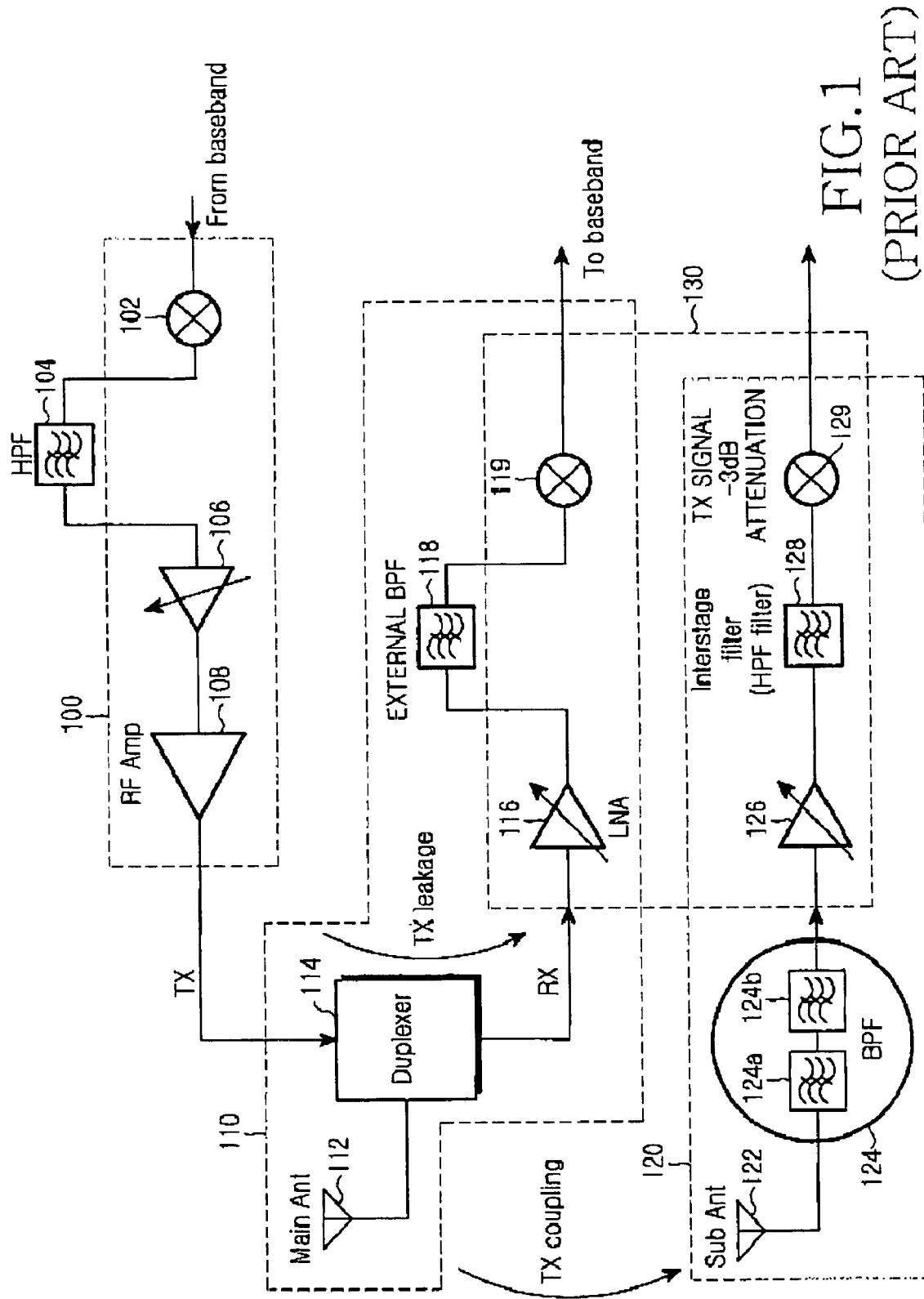
FIG. 1 illustrates the construction of a diversity system of a mobile terminal having a sub-receiving unit added thereto.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

One element that determines the sensitivity of a terminal is cross modulation (CM) noise. CM noise is generally the result of non-linear components occurring through active devices of the terminal, i.e., an LNA and a mixer of a mobile terminal receiving unit.

Figure 2:
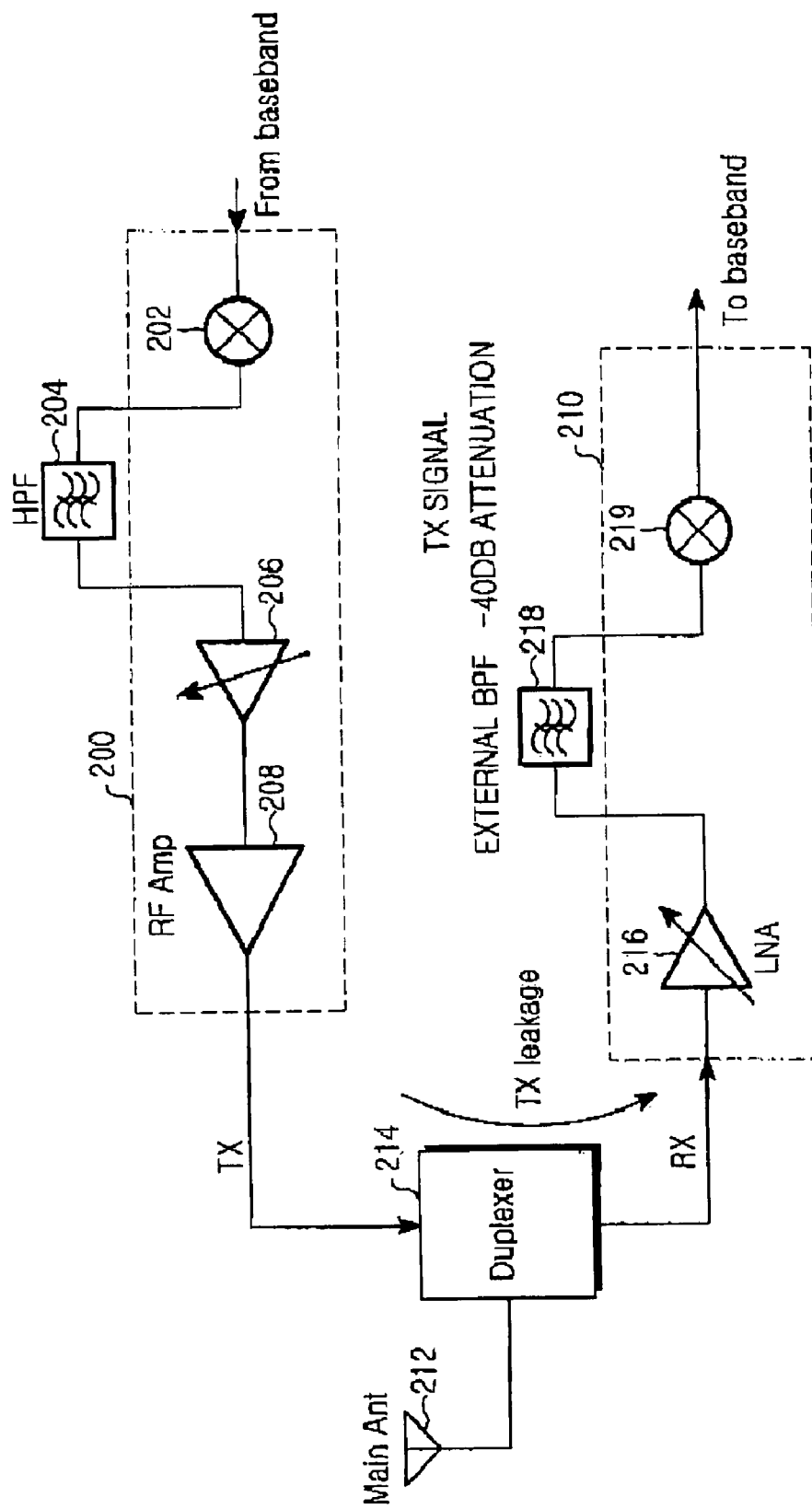
FIG. 2 is a view explaining attenuation of a transmitted signal through an external BPF in a diversity system of a general mobile terminal.

Referring to FIG. 2, a baseband signal input from a modem of the terminal is converted into a high frequency signal through a mixer 202, an HPF 204, an LNA 206, and a high-frequency amplifier 208 of a transmitting unit 200. The high-frequency signal input from the high-frequency amplifier 208 to a main antenna 212 is modulated to a BB signal through a duplexer 214, and through an LNA 216, an external BPF 218 and a mixer 219 of a receiving unit 210.

A part of the transmitted signal (hereinafter referred to as a "transmitted signal leakage") output from the transmitting unit 200 enters into the receiving unit 210 through the duplexer 214, and is modulated with a single-tone jammer in the LNA 216 to cause the occurrence of the CM noise.

Accordingly, in order to prevent the transmitted signal from entering into the receiving unit 210 through the duplexer 214, duplexer isolation is requested. General duplexer isolation has the effect of attenuating the transmitted signal by about −55 dB.

Figure 3:
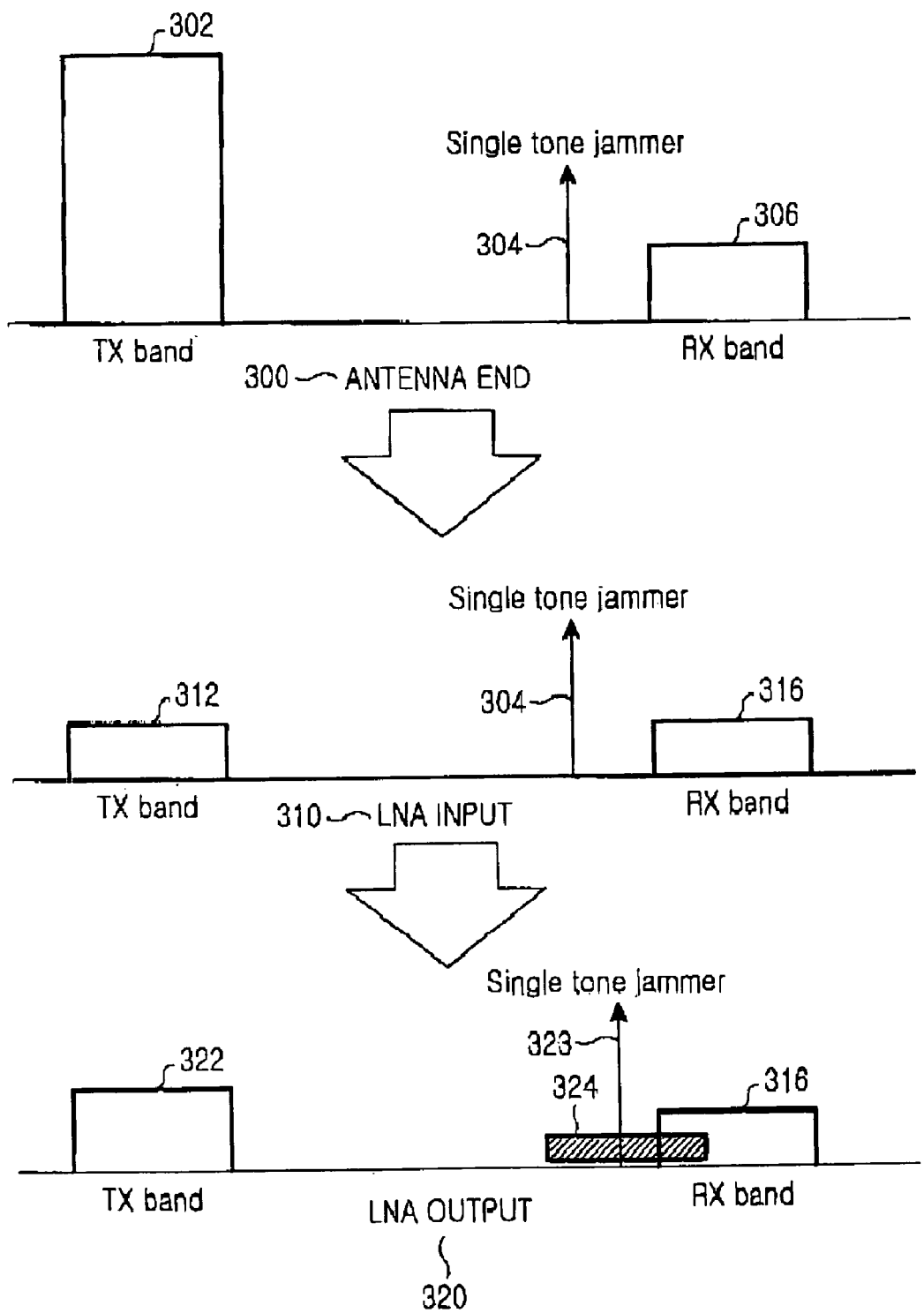
FIG. 3 is a view explaining a CM noise occurring in a general main receiving unit.

Referring now to FIGS. 2 and 3, an antenna end 300 shows transmitted signal leakage 302 transmitted to the main antenna 212, a single-tone jammer 304 and a received signal 306 of the receiving unit 210. The single-tone jammer 304 that affects the received signal 306 is in the range of −30 dBm.

The transmitted signal leakage 302 at an input terminal 310 of the LNA 216 is attenuated through the duplexer isolation, and due to an attenuated transmitted signal leakage 312, a received signal 316 is reduced in size in comparison to the received signal 306 of the antenna end 300.

In view of the output terminal 320 of the LNA 216, the attenuated transmitted signal leakage 312 is modulated with the single-tone jammer 304 as it passes through the LNA 216, and acts on the received signal 316 as the CM noise 324, resulting in that the receiving sensitivity is degraded. Although the CM noise 324 occurring in the LNA 216 is greatly influenced by the isolation capability of the duplexer 214, it matters little since the size of the transmitted signal 302 is greatly reduced to the attenuated transmitted signal leakage 312 by the isolation. However, after passing through the LNA 216, the single-tone jammer 323 and the attenuated transmitted signal leakage 322 are added together, requiring attenuation of the transmitted signal leakage 322 once more.

Accordingly, the transmitted signal leakage 322 is attenuated again through the BPF 218 that follows the LNA 216, and thus the CM noise after the mixer 219 does not matter greatly.

Referring again to FIG. 1, in the sub-receiving unit 120, two RF SAW filters 124a and 124b are provided in front of the LNA 126, and thus the transmitted signal leakage coming from the main antenna 112 to the sub-antenna 122 is suppressed. However, since the RF SAW filter is a filter based on a physical structure, it is difficult to reduce its size, and its structure is relatively complicated and high-priced. That is, the size and the cost of the SAW filter impose a great burden on the mobile terminal.

In the present invention, the size and the cost of the RF SAW filter can be reduced by replacing one of two RF SAW filters by an HPF in the sub-receiving unit.

The RF SAW filter is a type of BPF that passes therethrough only the same frequency as the mechanical and physical frequency of the filter itself, and has a narrow pass bandwidth so that it completely filters unnecessary frequencies. Additionally, the RF SAW filter can be manufactured to have an unbalanced attenuation characteristic.

Figure 4:
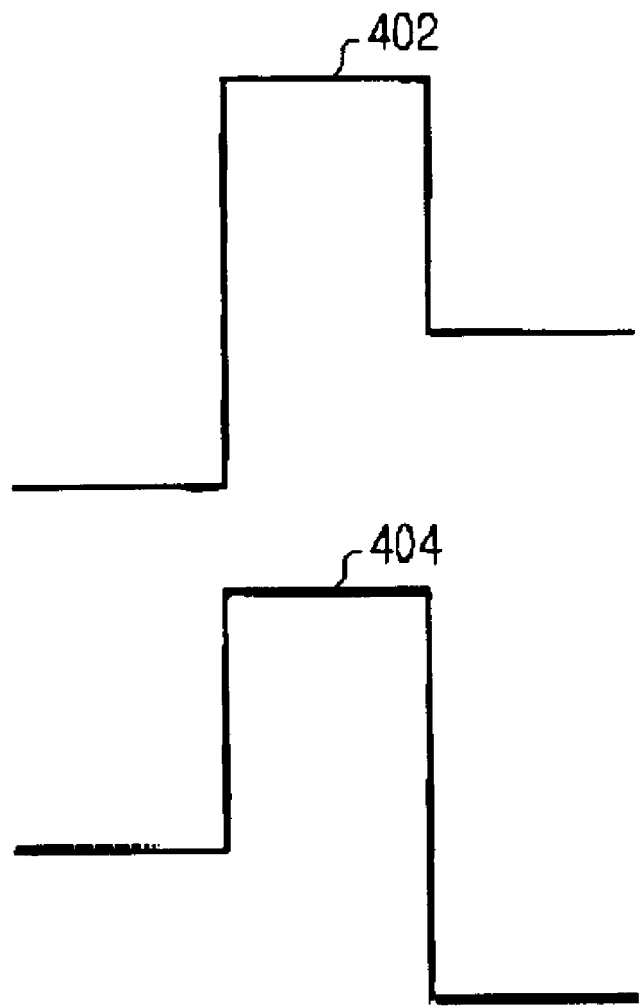
FIG. 4 illustrates a response characteristic of an RF SAW filter.

FIG. 4 is a graph illustrating the response characteristics of an RF SAW filter. It is possible to manufacture the RF SAW filter so that it passes therethrough only a specified band. Specifically, the RF SAW filter may have greater attenuation on a lower band frequency such as a pulse 402, or less attenuation on an upper band frequency as a pulse 404.

Accordingly, using the characteristics of the RF SAW filter as described above, the lower band frequency is greatly attenuated through the RF SAW filter, and then the signal that has passed through the RF SAW filter is additionally attenuated through an HPF, so that the characteristics obtained by using two BPFs can be obtained. Additionally, since the HPF can be fabricated on chip, the size of the receiving unit is reduced and the unit cost of production can be lowered.

Figure 5:
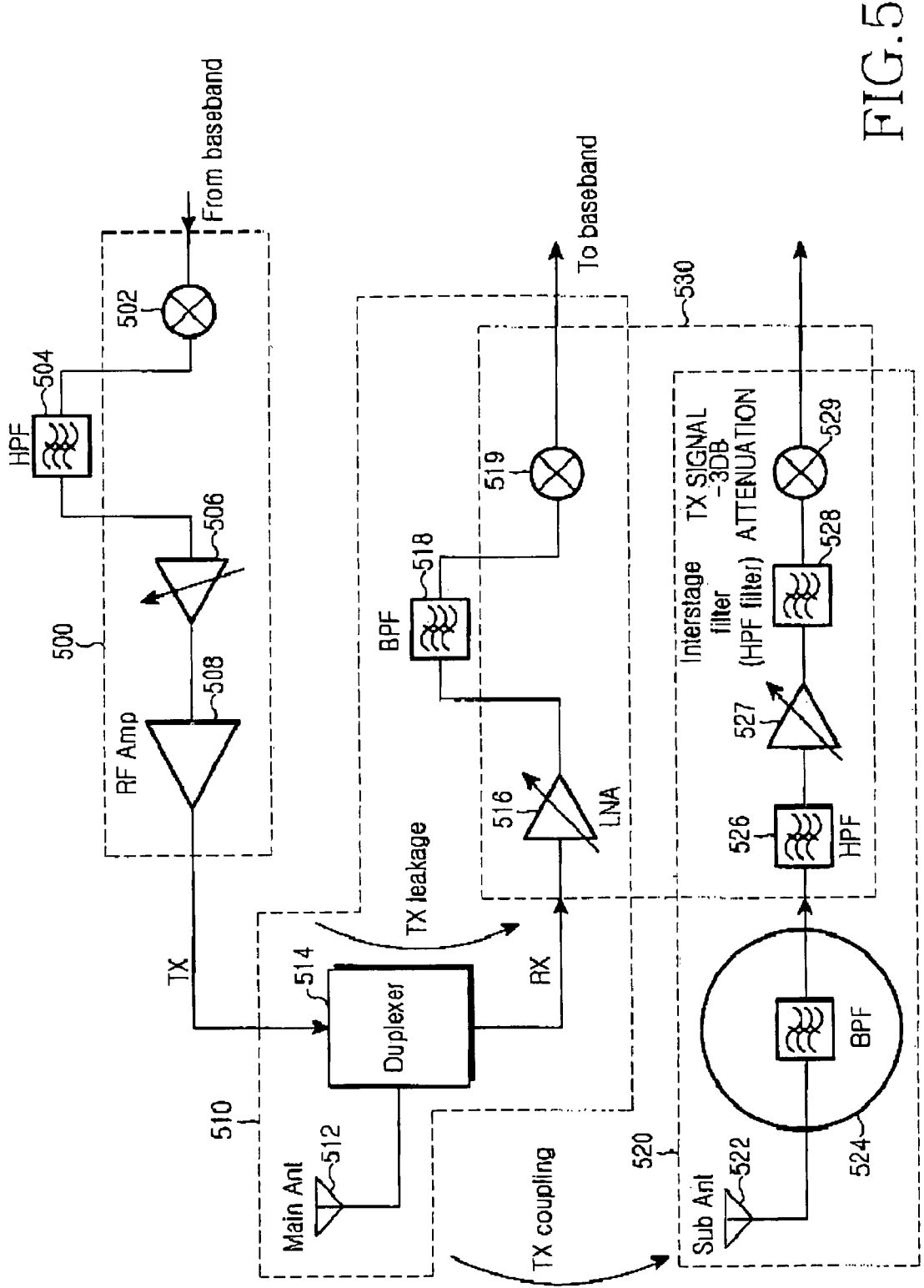
FIG. 5 illustrates the construction of a diversity system of a mobile terminal according to a preferred embodiment of the present invention.

FIG. 5 illustrates the construction of the diversity system of the mobile terminal according to a preferred embodiment of the present invention. The diversity system of the mobile terminal includes a transmitting unit 500 and a receiving unit 530 having a main receiving unit 510 and a sub-receiving unit 520.

The transmitting unit 500 includes a mixer 502, an HPF 504, an LNA 506 and a high-frequency amplifier 508. The transmitting unit 500 converts a baseband (BB) signal input from the modem of the mobile terminal into a high-frequency signal, and outputs the high-frequency signal as a transmitted signal. At this time, a part of the transmitted signal enters into a main antenna 512 and a sub-antenna 522 of the receiving unit 530.

The main receiving unit 510 includes the main antenna 512, a duplexer 514, an LNA 516, an external BPF 518 and a mixer 519. The sub-receiving unit 520 includes the sub-antenna 522, a BPF 524, an HPF1 526, an LNA 527, an HPF2 528, and a mixer 529. The received signals input through the main antenna 512 and the sub-antenna 522 are converted into BB signals, and the converted BB signals are input to the modem of the mobile terminal.

At this time, the transmitted signal leakage received through the sub-antenna 522 of the sub-receiving unit 520 passes through bpf 524, which is an RF SAW filter designed to greatly attenuate the lower band frequency, and thus the low frequency component of the transmitted signal leakage is attenuated. Then, the attenuated output value passes through the HPF 526 on chip of the receiving unit 530, and an additional attenuation of the output value is performed. The additionally attenuated signal then passes through the LNA 527, the HPF2 528 and the mixer 529 to reduce the amplified transmission signal leakage, and thus the CM noise does not matter greatly.

As described above, the effects obtained by the representative of the disclosed invention are as follows.

By replacing one of two BPFs in the sub-receiving unit by one HPF, the HPF can be fabricated on chip with the terminal receiving unit. Additionally, through the on-chip HPF, the use of an additional BPF is eliminated, and the size and the unit price of production of the mobile terminal can also be reduced.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus in a diversity system of a mobile terminal having a main receiving unit and a sub-receiving unit, the apparatus comprising:
   a sub-antenna for receiving an input signal and a part of a transmitted signal of a transmitting unit;
      a band-pass filter for attenuating a low-band frequency of the part of the transmitted signal received through the sub-antenna;
      a first high-pass filter for additionally attenuating the part of the transmitted signal attenuated through the band-pass filter;
      a low-noise amplifier for minimizing the noise of an output value of the first high-pass filter;
      a second high-pass filter for passing therethrough only a high-frequency component of an output value of the low-noise amplifier; and
   a mixer for mixing output values of the second high-pass filter and outputting a baseband signal.

2. The apparatus as claimed in claim 1, wherein the band-pass filter is a high-frequency SAW (Surface Acoustic Wave) filter.

3. The apparatus as claimed in claim 1, wherein the band-pass filter attenuates a lower band frequency of a transmitted signal leakage, greater than an upper band frequency of the transmitted signal leakage.

* * * * *